(12) United States Patent
Hafizi

(10) Patent No.: US 8,023,591 B2
(45) Date of Patent: Sep. 20, 2011

(54) METHOD AND SYSTEM FOR A SHARED GM-STAGE BETWEEN IN-PHASE AND QUADRATURE CHANNELS

(75) Inventor: Madjid Hafizi, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 950 days.

(21) Appl. No.: 11/618,866

(22) Filed: Dec. 31, 2006

(65) Prior Publication Data

US 2008/0139162 A1 Jun. 12, 2008

Related U.S. Application Data

(60) Provisional application No. 60/868,818, filed on Dec. 6, 2006.

(51) Int. Cl.
*H03D 3/00* (2006.01)
*H04L 27/14* (2006.01)

(52) U.S. Cl. ........ 375/334; 375/316; 327/355; 455/325; 455/326

(58) Field of Classification Search .................. 455/325, 455/326; 327/355; 375/316, 334
See application file for complete search history.

(56) References Cited

U.S. PATENT DOCUMENTS

| 5,410,743 | A * | 4/1995 | Seely et al. | 455/326 |
|---|---|---|---|---|
| 7,519,348 | B2 * | 4/2009 | Shah | 455/285 |
| 2006/0068746 | A1 * | 3/2006 | Feng et al. | 455/323 |
| 2008/0014896 | A1 * | 1/2008 | Zhuo et al. | 455/326 |

* cited by examiner

*Primary Examiner* — Ted Wang
(74) *Attorney, Agent, or Firm* — McAndrews, Held & Malloy, Ltd.

(57) ABSTRACT

Aspects of a method and system for a shared GM-stage between in-phase and quadrature channels may include processing an in-phase (I) component signal for the I channel and a quadrature (Q) component signal for the Q channel via one or more shared transconductance stages in a frequency demodulator. The I channel may be isolated from the Q channel and the Q channel may be isolated from the I channel using isolation resistors. The values of the isolation resistors may be selected so as to balance the isolation and signal attenuation. A folding circuit, comprising active devices, may isolate the I channel from the Q channel. A generated voltage may be utilized to bias the folding circuit. An oscillator for the I channel may be isolated from a mixer for the Q channel and an oscillator for the Q channel may be isolated from a mixer for the I channel.

28 Claims, 9 Drawing Sheets

METHOD AND SYSTEM FOR A SHARED GM-STAGE BETWEEN IN-PHASE AND QUADRATURE CHANNELS

CROSS-REFERENCE TO RELATED APPLICATIONS/INCORPORATION BY REFERENCE

This patent application makes reference to, claims priority to, and claims the benefit of U.S. Provisional Application Ser. No. 60/868,818, filed on Dec. 6, 2006.

This application makes reference to U.S. application Ser. No. 11/618,853 filed on even date herewith.

Each of the above stated applications is hereby incorporated herein by reference in its entirety.

FIELD OF THE INVENTION

Certain embodiments of the invention relate to electronic circuit design and signal processing. More specifically, certain embodiments of the invention relate to a method and system for a shared GM-stage between In-Phase and Quadrature channels.

BACKGROUND OF THE INVENTION

In wireless communication systems, a received radio frequency (RF) signal may be converted to an intermediate frequency (IF), and then from IF to a baseband signal, where the IF may be in the megahertz range. For certain systems, it may also be possible to convert directly from RF to baseband. Generally, the RF signal may be mixed with a local oscillator signal that results in two (double) sideband signals that are the sum of the frequencies of the two signals and the difference of the frequencies of the two signals, where the difference is often called 'beat frequency'. The lower frequency component is typically the signal that is required for further processing of the signal. One of the two sideband signals may be chosen as an IF signal, and this IF signal may be the same for all received RF signals. Therefore, a radio that may receive a plurality of channels, such as a Wireless LAN radio, may tune to a particular frequency corresponding to one of 11 standard channels by changing the local oscillator signal frequency such that the IF remains constant. With a constant IF, most of the receive path may be common in the receiver.

Today, much of radio receiver development may be driven mostly by a great demand for mobile wireless communication devices, including handsets. With the ever-decreasing size of mobile handsets, capacities of smaller batteries may be an issue. As most of these handsets may utilize complementary metal-oxide semiconductor (CMOS) technology for analog-to-digital conversion, and for much of the processing of voice and data signals, a very important factor to consider is that it may be advantageous for CMOS devices to operate at lower frequencies. This may be crucial since CMOS devices have power dissipation directly related to the speed at which the CMOS devices switch. The faster the frequencies, the faster the CMOS device switching speed, and therefore, the greater the amount of power consumed. Therefore, receivers may be designed to downconvert the high frequency RF, which may be in gigahertz range, to a lower frequency, preferably to a baseband frequency, as quickly as possible.

Besides the operation of frequency downconversion, the demodulation circuitry also separates the in-phase (I) channel from the (Q) quadrature channel. The received RF signal may be written as the sum of a component modulated onto a cosine at the carrier frequency and a component modulated onto a sine at the carrier frequency. The component modulating the cosine is termed the in-phase component and the term modulating the sine is termed the quadrature component since the sine wave is equivalent to a cosine wave with a 90 degree phase shift.

The separation of the channel may be achieved by multiplying the received signal with the local oscillator as described above. The baseband component of this operation may then be processed as the I channel. To obtain the Q channel, the received signal can be multiplied with the local oscillator signal that is phase shifted by 90 degrees.

Another important factor to consider may be the signal integrity in the signal path. Because signals received at a receiver's antenna may be very weak, for example, six millivolts (6 mV), the first component to process the received signal may be a low noise amplifier (LNA) that is designed to amplify signals while adding very little additional noise to the signal being amplified. The amplified signal may be filtered to attenuate undesired signals, amplified further to increase the strength of the signal, and mixed with local oscillator signals to downconvert to lower frequencies. Factors such as process, voltage and temperature (PVT) variations may also result in a DC offset.

Due to limitations on the power consumption, in particular for the mobile communications terminal, it is crucial to minimize the number of components and the die area required for analog RF circuitry. Fewer components, in particular, active components, may also help to keep heat dissipation down and reduce power consumption when the circuits are idle, due to less biasing currents. Also very significant is that certain analog components may take up disproportionate amounts of space on integrated circuits and their use is therefore to be kept to a minimum. Examples are inductors and large capacitors.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for a shared GM-stage between In-Phase and Quadrature channels, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for a shared GM-stage between in-phase and quadrature channels with an active mixer. Certain aspects of the invention may comprise processing an in-phase component signal for the in-phase channel and a quadrature component signal for the quadrature channel via one or more shared transconductance stages in a frequency demodulator. The in-phase channel may be isolated from the quadrature channel and the quadrature channel may be isolated from the in-phase channel using isolation resistors. The values of the isolation resistors may be selected so as to balance the isolation and signal attenuation. A folding circuit, which may utilize one or more active devices, may be utilized to isolate the in-phase channel from the quadrature channel. A voltage may be generated and utilized to bias the folding circuit. An oscillator for the in-phase channel may be isolated from a mixer for the quadrature channel and an oscillator for the quadrature channel may be isolated from a mixer for the in-phase channel. One or more signals may be utilized to bias a mixer stage and the transconductance stage of the frequency demodulator.

Figure 1A:
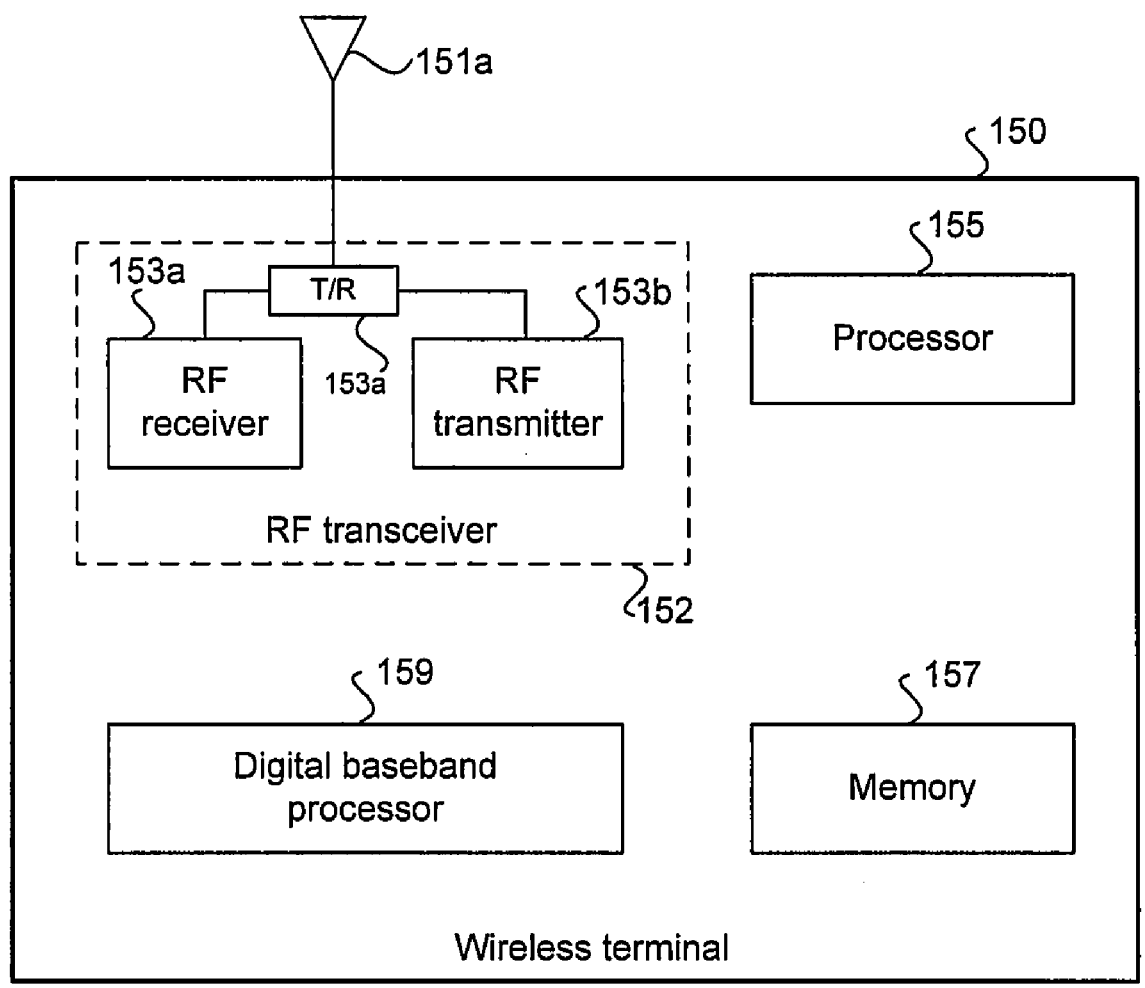
FIG. 1A is a block diagram illustrating an exemplary wireless terminal, in accordance with an embodiment of the invention.

FIG. 1A is a block diagram illustrating an exemplary wireless terminal, in accordance with an embodiment of the invention. Referring to FIG. 1A, there is shown a wireless terminal 150 that may comprise an RF receiver 153a, an RF transmitter 153b, a digital baseband processor 159, a processor 155, and a memory 157. In some embodiments of the invention, the RF receiver 153a and the RF transmitter 153b may be integrated within an RF transceiver 152, for example. A single transmit and receive antenna 151a may be communicatively coupled to the RF receiver 153a and the RF transmitter 153b. A switch or other device having switching capabilities may be coupled between the RF receiver 153a and RF transmitter 153b, and may be utilized to switch the antenna between transmit and receive functions. The wireless terminal 150 may be operated in a system, such as the Wireless Local Area Network (WLAN), a cellular network and/or digital video broadcast network, for example. In this regard, the wireless terminal 150 may support a plurality of wireless communication protocols, including the IEEE 802.11 n standard specifications for WLAN networks.

The RF receiver 153a may comprise suitable logic, circuitry, and/or code that may enable processing of received RF signals. The RF receiver 153a may enable receiving RF signals in a plurality of frequency bands in accordance with the wireless communications protocols that may be supported by the wireless terminal 150. Each frequency band supported by the RF receiver 153a may have a corresponding front-end circuit for handling low noise amplification and down conversion operations, for example. In this regard, the RF receiver 153a may be referred to as a multi-band receiver when it supports more than one frequency band. In another embodiment of the invention, the wireless terminal 150 may comprise more than one RF receiver 153a, wherein each of the RF receiver 153a may be a single-band or a multi-band receiver. The RF receiver 153a may be implemented on a chip. In an embodiment of the invention, the RF receiver 153a may be integrated with the RF transmitter 153b on a chip to comprise the RF transceiver 152, for example. In another embodiment of the invention, the RF receiver 153a may be integrated on a chip with more than one component in the wireless terminal 150.

The RF receiver 153a may quadrature down convert the received RF signal to a baseband frequency signal that comprises an in-phase (I) component and a quadrature (Q) component. The RF receiver 153a may perform direct down conversion of the received RF signal to a baseband frequency signal, for example. In some instances, the RF receiver 153a may enable analog-to-digital conversion of the baseband signal components before transferring the components to the digital baseband processor 159. In other instances, the RF receiver 153a may transfer the baseband signal components in analog form.

The digital baseband processor 159 may comprise suitable logic, circuitry, and/or code that may enable processing and/or handling of baseband frequency signals. In this regard, the digital baseband processor 159 may process or handle signals received from the RF receiver 153a and/or signals to be transferred to the RF transmitter 153b, when the RF transmitter 153b is present, for transmission to the network. The digital baseband processor 159 may also provide control and/or feedback information to the RF receiver 153a and to the RF transmitter 153b based on information from the processed signals. The digital baseband processor 159 may communicate information and/or data from the processed signals to the processor 155 and/or to the memory 157. Moreover, the digital baseband processor 159 may receive information from the processor 155 and/or to the memory 157, which may be processed and transferred to the RF transmitter 153b for transmission to the network. In an embodiment of the invention, the digital baseband processor 159 may be integrated on a chip with more than one component in the wireless terminal 150.

The RF transmitter 153b may comprise suitable logic, circuitry, and/or code that may enable processing of RF signals for transmission. The RF transmitter 153b may enable transmission of RF signals in a plurality of frequency bands. Each frequency band supported by the RF transmitter 153b may have a corresponding front-end circuit for handling amplification and up conversion operations, for example. In this regard, the RF transmitter 153b may be referred to as a multi-band transmitter when it supports more than one frequency band. In another embodiment of the invention, the wireless terminal 150 may comprise more than one RF transmitter 153b, wherein each of the RF transmitter 153b may be a single-band or a multi-band transmitter. The RF transmitter 153b may be implemented on a chip. In an embodiment of the invention, the RF transmitter 153b may be integrated with the RF receiver 153a on a chip to comprise the RF transceiver 152, for example. In another embodiment of the invention, the RF transmitter 153b may be integrated on a chip with more than one component in the wireless terminal 150.

The RF transmitter 153b may quadrature up convert the baseband frequency signal comprising I/Q components to an RF signal. The RF transmitter 153b may perform direct up conversion of the baseband frequency signal to a baseband frequency signal, for example. In some instances, the RF transmitter 153b may enable digital-to-analog conversion of the baseband signal components received from the digital baseband processor 159 before up conversion. In other instances, the RF transmitter 153b may receive baseband signal components in analog form.

The processor 155 may comprise suitable logic, circuitry, and/or code that may enable control and/or data processing operations for the wireless terminal 150. The processor 155 may be utilized to control at least a portion of the RF receiver 153a, the RF transmitter 153b, the digital baseband processor 159, and/or the memory 157. In this regard, the processor 155 may generate at least one signal for controlling operations within the wireless terminal 150. The processor 155 may also enable executing of applications that may be utilized by the wireless terminal 150. For example, the processor 155 may generate at least one control signal and/or may execute applications that may enable current and proposed WLAN communications in the wireless terminal 150.

The memory 157 may comprise suitable logic, circuitry, and/or code that may enable storage of data and/or other information utilized by the wireless terminal 150. For example, the memory 157 may be utilized for storing processed data generated by the digital baseband processor 159 and/or the processor 155. The memory 157 may also be utilized to store information, such as configuration information, that may be utilized to control the operation of at least one block in the wireless terminal 150. For example, the memory 157 may comprise information necessary to configure the RF receiver 153a for receiving WLAN signals in the appropriate frequency band. Various embodiments of the invention may be utilized in analog signal processing circuitry of the RF receiver 153a.

Figure 1B:
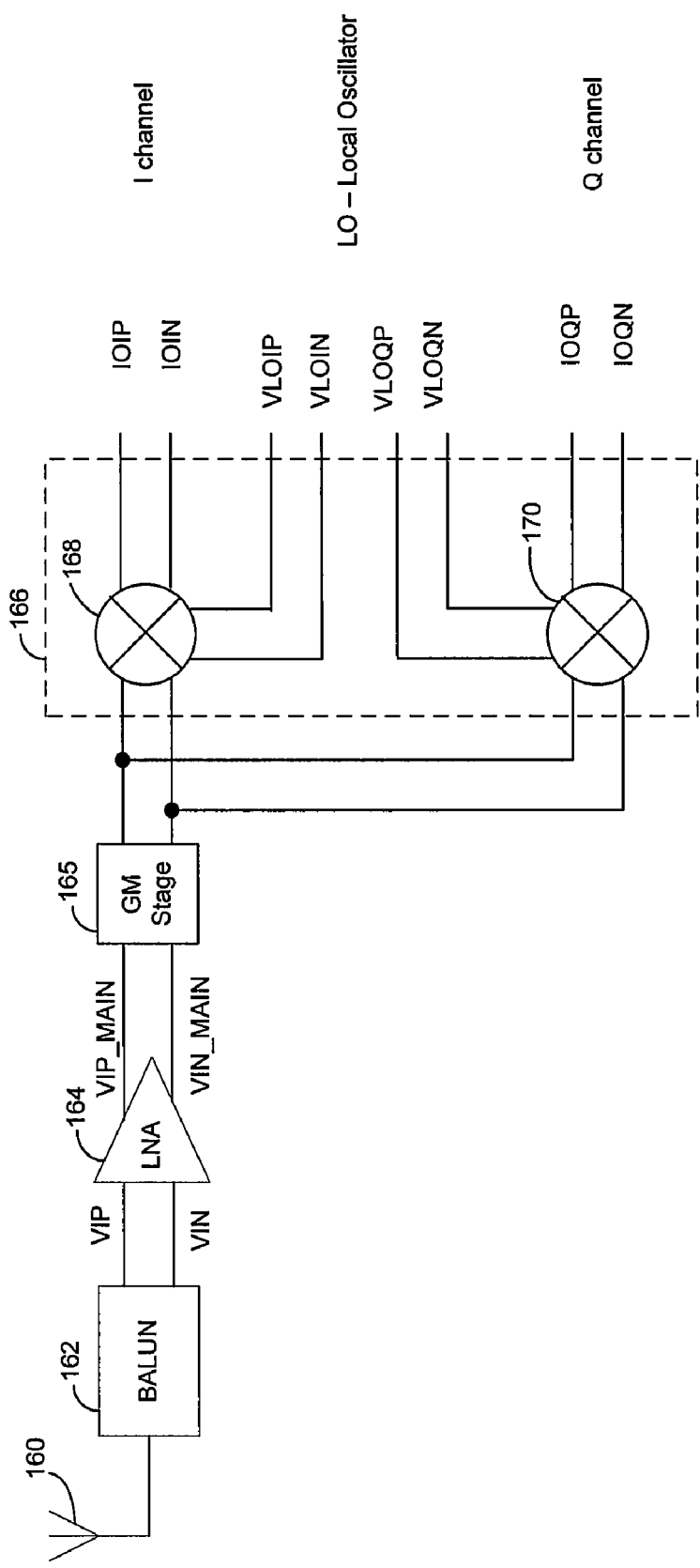
FIG. 1B is a block diagram illustrating an exemplary RF front-end architecture, in accordance with an embodiment of the invention.

FIG. 1B is a block diagram illustrating an exemplary RF front-end architecture, in connection with an embodiment of the invention. Referring to FIG. 1B, there is shown an antenna 160, a balun 162, a low-noise amplifier 164, a GM stage 165, and a demodulator 166. The demodulator 166 may comprise the multipliers 168 and 170. There is also shown in FIG. 1B, the voltage signals VIP, VIN, VIP_MAIN, VIN_MAIN, IOIP, IOIN, IOQP, IOQN, VLOIN, VLOIP, VLOQP and VLOQN.

In wireless radio frequency communication systems, the received signal may comprise an information-carrying baseband signal that may be modulated onto a carrier frequency that may typically be much higher than the bandwidth of the baseband signal. Hence, at the RF receiver front end, it may be necessary to remove the information-carrying baseband signal from the carrier by demodulating the received signal. Furthermore, the received RF signal may comprise both an in-phase and a quadrature phase component. Since these two signal components may be processed in separate receiver chains, it may be necessary to separate the in-phase (I) channel from the quadrature (Q) channel.

The received signal may be captured at the antenna 160. The received signal may typically be an unbalanced signal and may therefore be fed into a balun 162 to be converted into a balanced signal for further processing. Balun is a word-construct based on bal-anced and un-balanced. Baluns are electromagnetic coupling devices in a wide variety of different possible implementations to achieve the conversion from a balanced signal to an unbalanced signal and vice versa.

A balanced line is a transmission line made up of two conductors that both carry a signal with reference to ground. The signals may be designed to minimize the interference they create together by designing them in such a way that their respective electromagnetic fields may cancel each other. For example, the signals may be chosen to be the inverse of each other. In addition, balanced signals are robust to interference since interference that may be experienced on both conductors, may be removed easily.

Hence, the balanced line output of the balun 162 given by the balanced signals VIP and VIN, may be fed into a low-noise amplifier 164 for amplification before further processing. The amplified signals VIP_MAIN and VIN_MAIN may then be fed to the GM stage 165, where the differential voltage input signals may be converted to differential output currents. From the GM stage, the signal may be fed to the demodulator 166, where the carrier may be removed and the I channel may be separated from the Q channel. The demodulation and separation of the signal may be achieved by multiplying the input signal given on VIP_MAIN and VIN_MAIN with the local oscillator signal given by the differential input VLOIP and VLOIN. Multiplication in the multiplier 168 may produce a balanced output signal for the I channel, on IOIP/IOIN and multiplication with a phase shifted version of the local oscillator signal, that is VLOQP/VLOQN, in multiplier 170 may produce the Q channel.

The local oscillator frequency may be equal to the carrier frequency. In some systems, the demodulation may be achieved in two stages where the first demodulator will demodulate the signal to an intermediate frequency before a second demodulation stage will take the signal to baseband. In FIG. 1B, the demodulator 166 may be assumed to use a demodulator frequency equal to the carrier frequency and may produce a baseband output signal for the I channel, given in IOIP/IOIN and the Q channel, given in IOQP/IOQN. Various embodiments of the invention may be utilized by the demodulator 166.

Figure 1C:
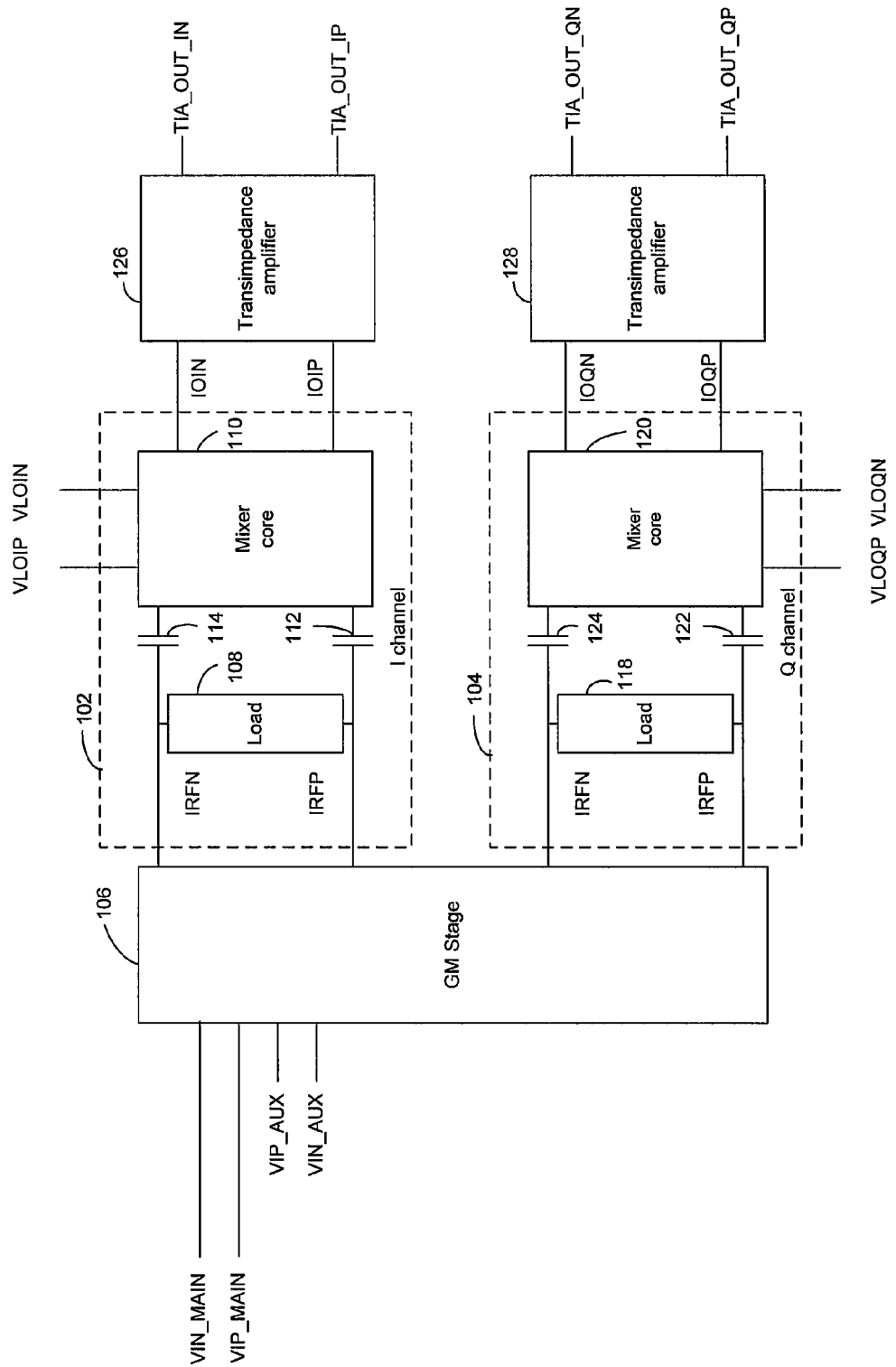
FIG. 1C is a block diagram illustrating an in-phase channel processing chain and a quadrature channel processing chain, in accordance with an embodiment of the invention.

FIG. 1C is a block diagram illustrating an in-phase channel processing chain and a quadrature channel processing chain, in connection with an embodiment of the invention. Referring to FIG. 1C, there is shown a GM stage 106, an in-phase (I) channel processing chain 102 and a quadrature (Q) channel processing chain 104, and transimpedance amplifiers 126 and 128. The I channel processing chain 102 may comprise a load 108, coupling capacitors 112 and 114 and a mixer core 110. The Q channel processing chain 104 may comprise a load 118, coupling capacitors 122 and 124 and a mixer core 120. There is also shown in FIG. 1C, input terminals VIP_MAIN, VIN_MAIN, VLOIN, VLOIP, VLOQP, VLOQN, VQP_AUX, VQN_AUX and outputs IOIN, IOIP, IOQN, IOQP, TIA_OUT_IN, TIA_OUT_IP. TIA_OUT_QN and TIA_OUT_QP. FIG. 1C may correspond to an exemplary demodulator functional block 166 in FIG. 1B.

The operation of the I channel processing chain and the Q channel processing chain may be nearly identical and may only differ in VLOQN being a phase-shifted version of VLOIN and VLOQP being a phase-shifted version of VLOIP, as explained for FIG. 1B. Hence, the Q channel processing chain may be regarded as functionally identical to the I channel processing chain and the explanations for the I channel processing chain that follow may equally apply to the Q channel processing chain.

Whereas the input signal VIN_MAIN and VIP_MAIN are voltage signals, the multiplication with the local oscillator signal VLOIP/VLOIN, may be achieved using a differential input current IRFN/IRFP to the mixer block 110 and may result in a differential output current given by IOIN and IOIP. The balanced input voltage VIN_MAI/VIP_MAIN may be converted to a proportional balanced current IRFN/IRFP. This may be achieved in the GM stage 106, where GM may stand for transconductance. The output of the mixer block 110, which may be proportional to the product of IRFN/IRFP and the oscillator voltage VLOIP/VLOIN, may be a balanced current IOIN/IOIP. The transimpedance block 126 may then convert the balanced output current to a balanced voltage TIA_OUT_IN/TIA_OUT_IP that may correspond to the I channel baseband signal.

The load 108 may serve as a high output impedance and may comprise an inductive load. The capacitors 114 and 112 may be coupling capacitors, which may enable blocking of DC current, thereby preventing the DC current from entering the mixer 110. The AC current IRFN/IRFP entering the mixer 110 may then be multiplied by the input voltage between VLOIP and VLOIN and may produce an output differential current between IOIP and IOIN that may be proportional to the input AC current multiplied by the input voltage between VLOIP and VLOIN.

The auxiliary inputs VIN_AUX and VIP_AUX may be used to improve the linearity of the GM stage 106, respectively.

Figure 2:
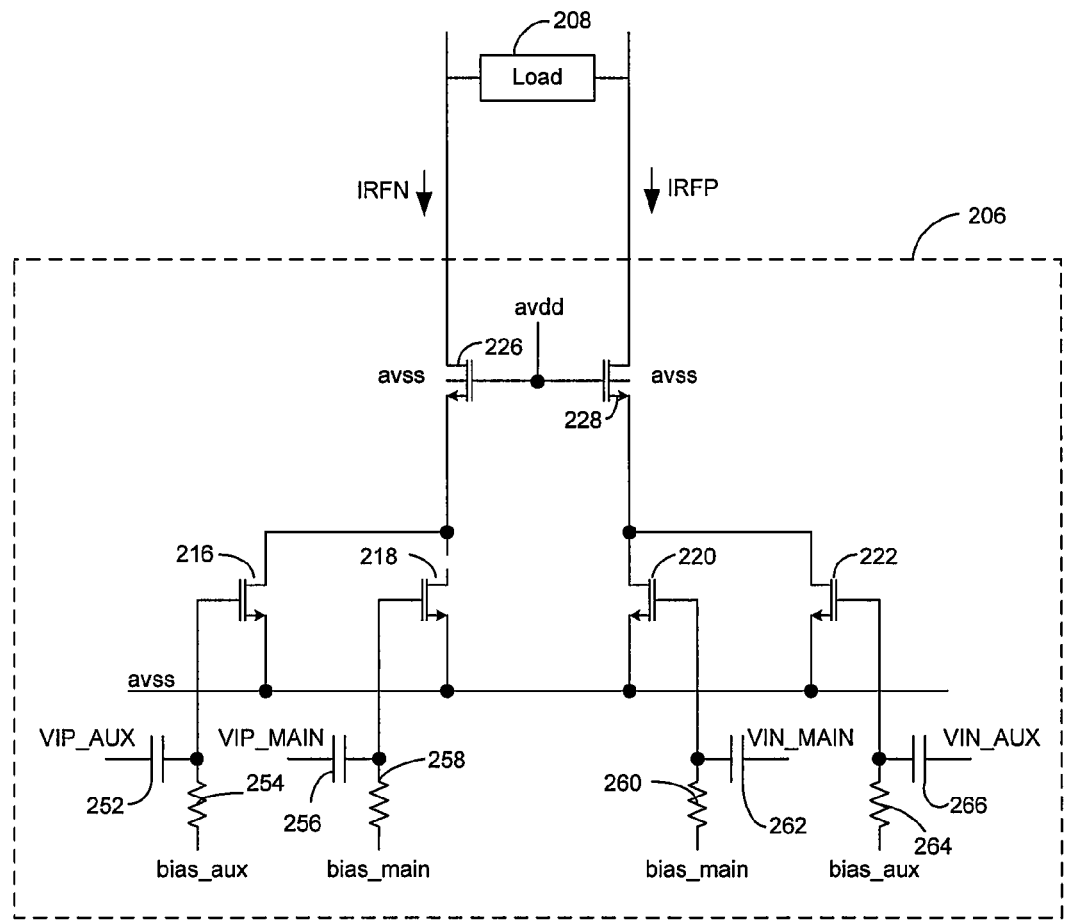
FIG. 2 is a diagram of an exemplary GM stage, in accordance with an embodiment of the invention.

FIG. 2 is a diagram of an exemplary GM stage, in accordance with an embodiment of the invention. Referring to FIG. 2, there is shown a GM stage 206 and a GM stage load 208. The GM stage may comprise MOSFETs 216, 218, 220, 222, 226 and 228, and resistors 254, 258, 260 and 264, and capacitors 252, 256, 262 and 266. There is also shown in FIG. 2, voltage signals VIP_AUX, VIN_AUX, VIP_MAIN, VIN_MAIN, currents IRFN, IRFP, and biasing signals bias_aux and bias_main.

The balanced input signal VIP_MAIN/VIN_MAIN and the auxiliary input signals VIP_AUX/VIN_AUX are biased and AC-coupled by means of the low-pass filters at the input terminals, connected to a bias voltage bias_main and bias_aux, respectively. The low-pass filter for VIP_AUX may comprise capacitor 256 and resistor 258. The low-pass filter for VIP_MAIN may comprise capacitor 252 and resistor 254. The low-pass filter for VIN_MAIN may comprise capacitor 262 and resistor 260. The low-pass filter for VIN_AUX may comprise capacitor 266 and resistor 264. The MOSFETs 216, 218, 220, 222, 226 and 228, collectively may convert the input voltage signal to a differential current IRFN/IRFP, in an appropriate exemplary configuration as illustrated in FIG. 2.

The GM stage load 208 may comprise a passive load that may comprise inductors and may be used to provide a high AC impedance and to filter out any capacitance from the GM stage 206. Alternatively, in one embodiment of the invention, the GM stage load 208 may comprise one or more circuits that may constitute an active load.

Figure 3A:
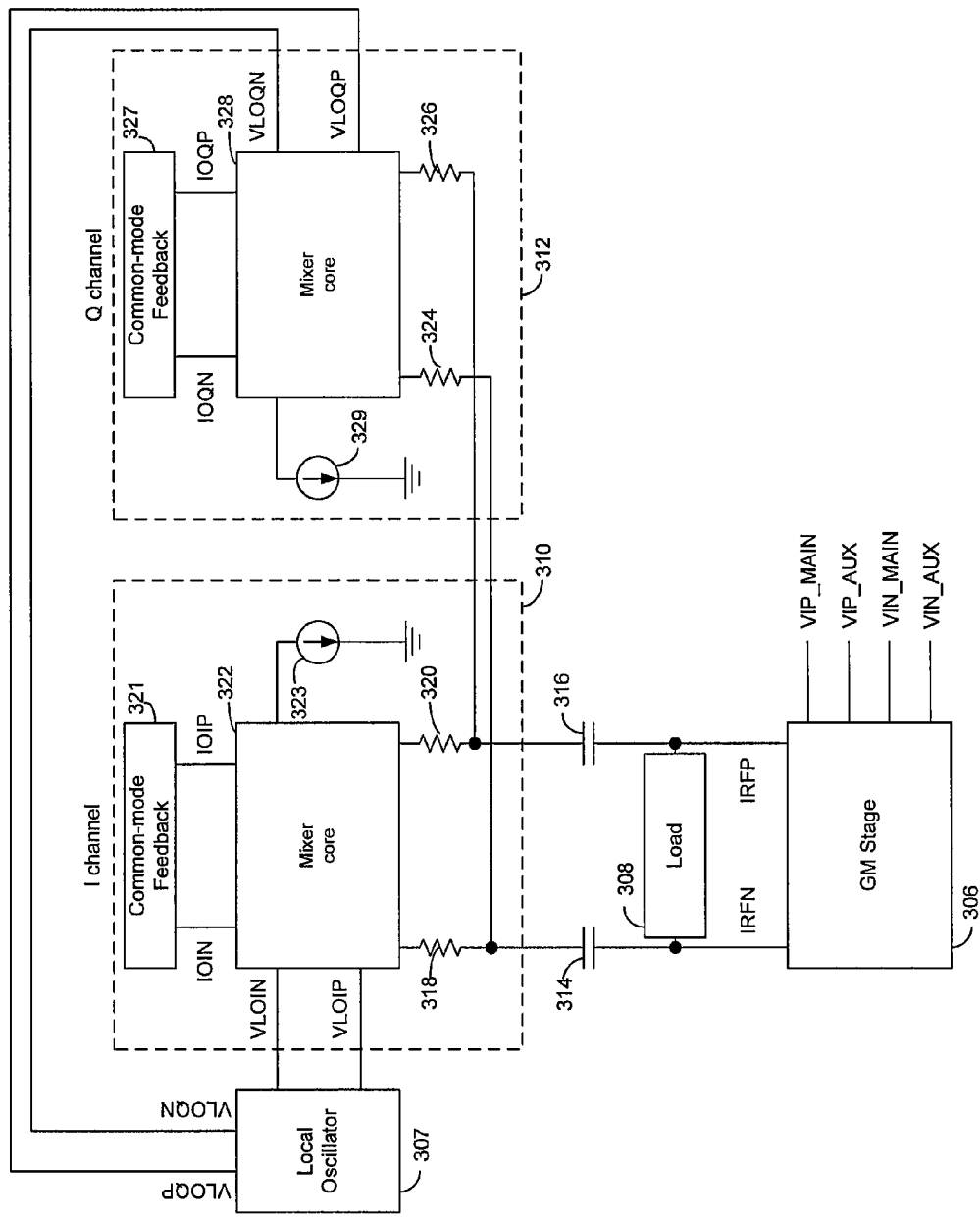
FIG. 3A is a block diagram illustrating an exemplary architecture of an in-phase channel processing chain and a quadrature channel processing chain with a shared GM stage, in accordance with an embodiment of the invention.

FIG. 3A is a block diagram illustrating an exemplary architecture of an in-phase channel processing chain and a quadrature channel processing chain with a shared GM stage, in accordance with an embodiment of the invention. Referring to FIG. 3A, there is shown a GM stage 306, a local oscillator 307, a GM stage load 308, and I channel processing block 310 and a Q channel processing block 312. The I channel processing block 310 may comprise isolation resistors 318 and 320, a current source 323, a common-mode feedback block 321, and a mixer core 322. The Q channel processing block may comprise isolation resistors 324 and 326, a current source 329, a common-mode feedback block 327 and a mixer core 328. There is further shown in FIG. 3A, input signals VIP_MAIN, VIN_MAIN, VIP_AUX, VIN_AUX, VLOIN, VLOIP, VLOQN and VLOQP, currents IRFN and IRFP and output currents IOIN, IOIP, IOQP and IOQN.

The I channel may be separated from the Q channel by multiplying the received signal with the local oscillator signal VLOIP/VLOIN from local oscillator 307 and a phase-shifted local oscillator signal VLOQP/VLOQN, respectively, as explained for FIG. 1B. From FIG. 1C, it may be observed that the operations of the I channel processing and the Q channel processing may be identical after the GM stage until the currents IRFN/IRFP enter the mixers 110 and 120, respectively. Hence, it may be feasible to use a common GM stage 306, GM stage load 308 and coupling capacitors 314 and 316. This may reduce the area needed to implement the circuit in an integrated circuit significantly, in particular, because one of the load blocks comprising inductors may be omitted. Furthermore, because a single GM stage 306 may be utilized, the currents flowing in GM stage 306 may be increased with respect to a prior-art architecture that may utilize two GM stages, one for the I channel and one for the Q channel. This may lead to better linearity in the demodulation circuit.

However, in various embodiments of the invention where a common GM stage may be used, there may be leakage of the local oscillator signal VLOIN/VLOIP from the I channel mixer core 322 into the inputs of the Q channel mixer core 328 and leakage of the phase-shifted local oscillator signal VLOQP/VLOQN from the Q channel mixer core 328 into the inputs of the I channel mixer core 322. This may occur due to the MOSFETs in the mixer core 322 and mixer core 328, respectively. In the exemplary architecture illustrated in FIG. 1C, the local oscillator signals of mixer 110 and 120 may be effectively isolated by the use of the GM stage 106.

If the signal from mixer 310 may leak into the inputs of mixer core 328 and vice versa, the effective separation of the I channel and the Q channel signals may no longer be possible. Therefore, the mixer core 322 may be isolated from the mixer core 328 as illustrated in FIG. 3A, by introducing small isolation resistors 318, 320, 324 and 326 into the signal path. The isolation resistors may be small in order to minimally load the input signal to the mixer core 322 and mixer core 328, while sufficiently reduce the oscillator signal leakage out of the mixers. The noise figure of the demodulator circuit may degrade due to the isolation resistors 318, 320, 324 and 326.

Figure 3B:
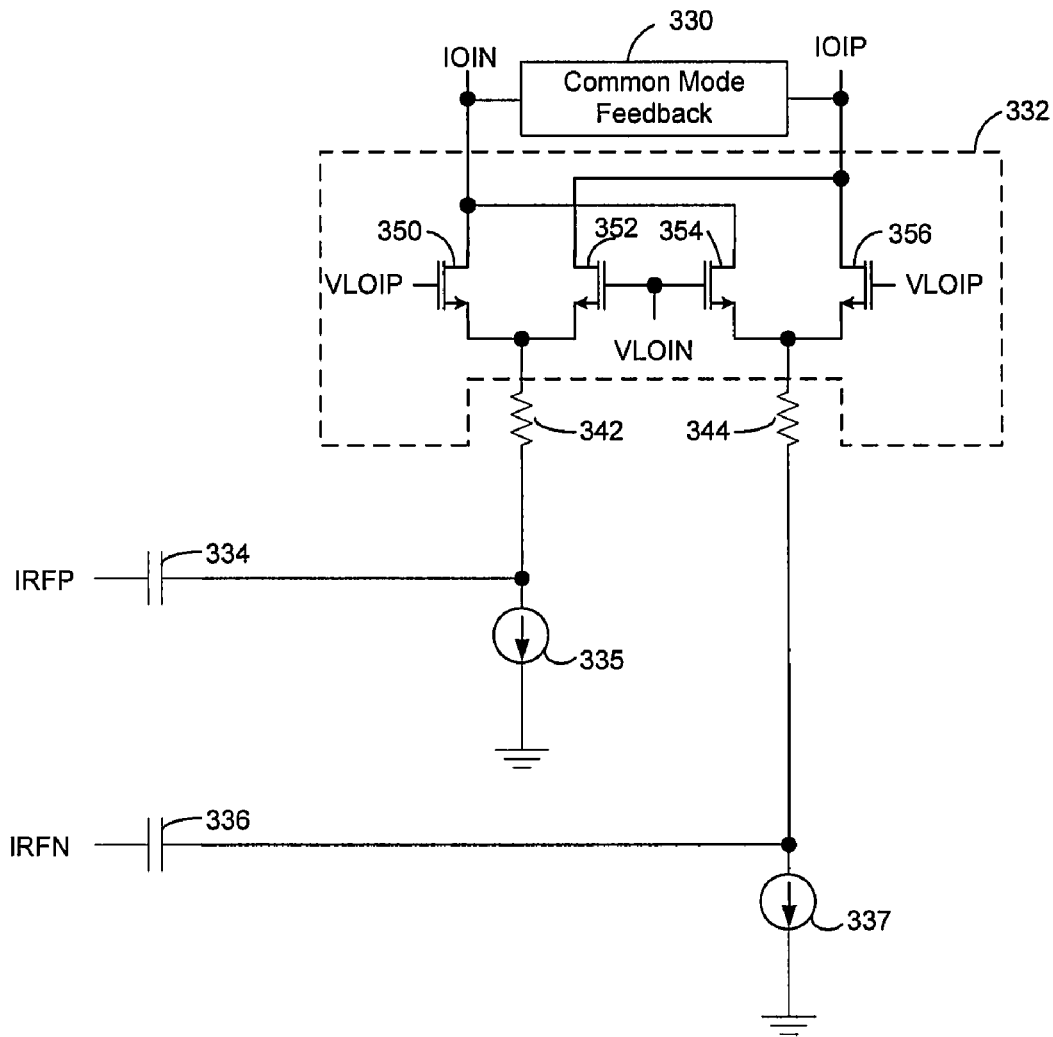
FIG. 3B is a diagram illustrating an exemplary active mixer, in accordance with an embodiment of the invention.

FIG. 3B is a diagram illustrating an exemplary active mixer, in accordance with an embodiment of the invention. Referring to FIG. 3B, there is shown, a mixer core 332, a common-mode feedback block 330, coupling capacitors 334 and 336, current sources 335 and 337, and isolation resistors 334 and 336. The mixer core 332 may comprise MOSFETs 350, 352, 354 and 356. There is also shown in FIG. 3B, the input currents IRFP and IRFN, the local oscillator signal VLOIP and VLOIN and the output currents IOIN and IOIP.

Referring to FIG. 3A, the I channel processing block 310 may comprise the same functional blocks as the Q channel processing block 312. FIG. 3B illustrates the I channel processing block 310 and the Q channel processing block 312, which may be assumed to comprise equivalent functional blocks. The addition of a common-mode feedback block 330 and the current sources 335 and 337 may render the mixer core 332 active. The common-mode feedback block 330 may correspond to the common-mode feedback block 321 illustrated in FIG. 3A, whereas the mixer core 332 corresponds to the mixer core 322 in FIG. 3A. The current sources 335 and 337 may correspond to current source 323 illustrated in FIG. 3A.

In accordance with an embodiment of the invention, a method and system for a shared GM-stage 306 between an in-phase channel processing block 310 and a quadrature channel processing block 312 may comprise processing an in-phase component signal for an in-phase channel and a quadrature component signal for a quadrature channel via one or more shared transconductance stages 306 in a frequency demodulator. The in-phase channel processing block 310 may enable processing of the in-phase component signal for the in-phase channel. The quadrature channel processing block 312 may enable processing of the quadrature component signal for the quadrature channel. The in-phase channel may be isolated from the quadrature channel and the quadrature channel may be isolated from the in-phase channel using isolation resistors 318, 320, 324 and 326. The values of the isolation resistors may be selected so as to balance the isolation and signal attenuation. The I channel processing block 310 may comprise isolation resistors 318 and 320, and a mixer core 322. The Q channel processing block 312 may comprise isolation resistors 324 and 326, and a mixer core 328. A common-mode feedback block 330, which may utilize one or more active devices, may be utilized to render the mixer core 332 active, in conjunction with the current sources 335 and 337. A local oscillator 307 for the in-phase channel 310 may be isolated from a mixer for the quadrature channel 320 and an oscillator for the quadrature channel may be isolated from a mixer for the in-phase channel. One or more signals may be utilized to bias a mixer stage and the transconductance stage of the frequency demodulator.

Figure 4A:
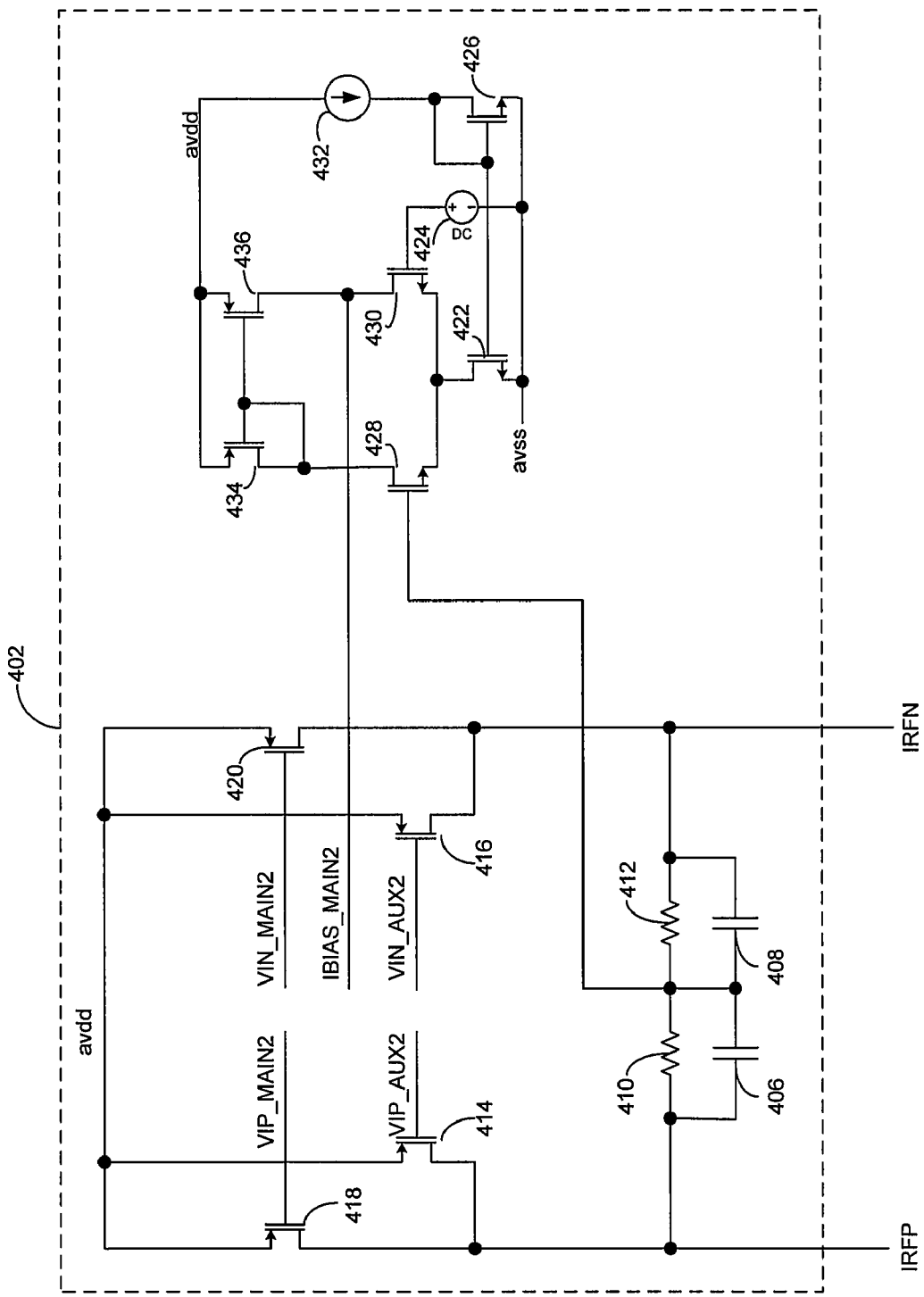
FIG. 4A is a diagram illustrating an exemplary GM stage active load, in accordance with an embodiment of the invention.

FIG. 4A is a diagram illustrating an exemplary GM stage active load, in accordance with an embodiment of the invention. Referring to FIG. 4A, there is shown an active load block 402. The active load block 402 may comprise capacitors 406 and 408, resistors 410 and 412, MOSFETs 414, 416, 418, 420, 422, 426, 428, 430, 434 and 436, a voltage source 424, and a current source 432. There is also shown in FIG. 4A, input currents IRFP and IRFN, voltage inputs VIP_MAIN2, VIN_MAIN2, IBIAS_MAIN2, VIP_AUX2 and VIN_AUX2, and supply voltages avdd and avss.

One terminal of resistor 410 and capacitor 406 may be coupled to IRFP. The other terminal of resistor 410 may be coupled with the other terminal of capacitor 406 and one terminal of resistor 412 and capacitor 408 and the gate of MOSFET 428. The other terminal of resistor 412 and capacitor 408 may be coupled to IRFN. The gate of MOSFET 414 may be coupled to VIP_AUX2, the drain of MOSFET 414 may be coupled to IRFP and the source of MOSFET 414 may be coupled to avdd. The gate of MOSFET 418 may be coupled to VIP_MAIN2, the drain of MOSFET 418 may be coupled to IRFP and the source of MOSFET 418 may be coupled to avdd. The gate of MOSFET 416 may be coupled to VIN_AUX2, the drain of MOSFET 416 may be coupled to IRFN and the source of MOSFET 416 may be coupled to avdd.

The gate of MOSFET 420 may be coupled to VIN_MAIN2, the drain of MOSFET 420 may be coupled to IRFN and the source of MOSFET 420 may be coupled to avdd. The drain of MOSFET 428 may be coupled to the drain and gate of MOSFET 434 and the gate of MOSFET 436. The sources of MOSFETs 434 and 436 may be coupled to avdd. The source of MOSFET 436 may be coupled to the drain of MOSFET 430 and IBIAS_MAIN2. The sources of MOSFETs 428 and 430 may be coupled to the drain of MOSFET 422. The source of MOSFET 422 may be coupled to avss. The gate of MOSFET 422 may be coupled to the gate and drain of MOSFET 426. The source of MOSFET 426 may be coupled to avss. The positive terminal of the voltage source 424 may be coupled to the gate of MOSFET 430 and the negative terminal of the voltage source 424 may be coupled to avss. One terminal of the current source 432 may be coupled to avdd and the other terminal of the current source 432 may be coupled to the drain of MOSFET 426.

Figure 4B:
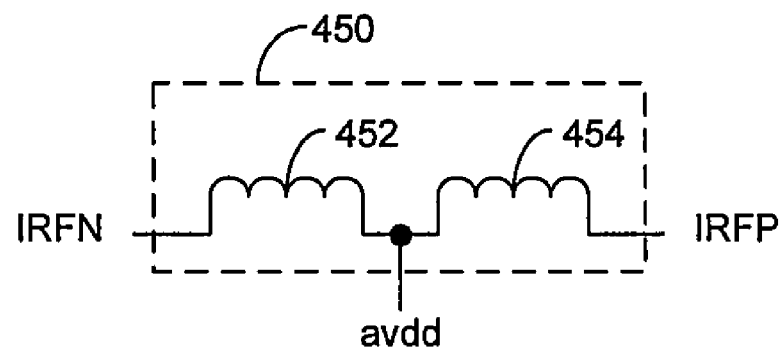
FIG. 4B is a diagram illustrating an exemplary passive load, in accordance with an embodiment of the invention.

The exemplary circuit illustrated in FIG. 4A may be used to replace the GM stage load 308 in FIG. 3A. Since passive loads, as illustrated in FIG. 4B, may comprise inductors that may require large die areas, it may be advantageous to replace the passive load with an active load, as illustrated in FIG. 4A. Such an architecture may save die area and may also provide a more constant load over a large band of operating frequencies, that is, wideband operation.

FIG. 4B is a diagram illustrating an exemplary passive load, in connection with an embodiment of the invention. Referring to FIG. 4B, there is shown a passive load 450. The passive load 450 may comprise of inductors 452 and 454.

Instead of an active load 402, a passive load 450 may be used in place of the generic GM stage load 308, illustrated in FIG. 3A. The main advantage of a passive load may be the absence of quiescent current draw since there are no active elements comprised in the passive load 450. On the other hand, as explained for FIG. 4A, inductors may take up a lot of die area in an integrated circuit implementation.

Figure 5:
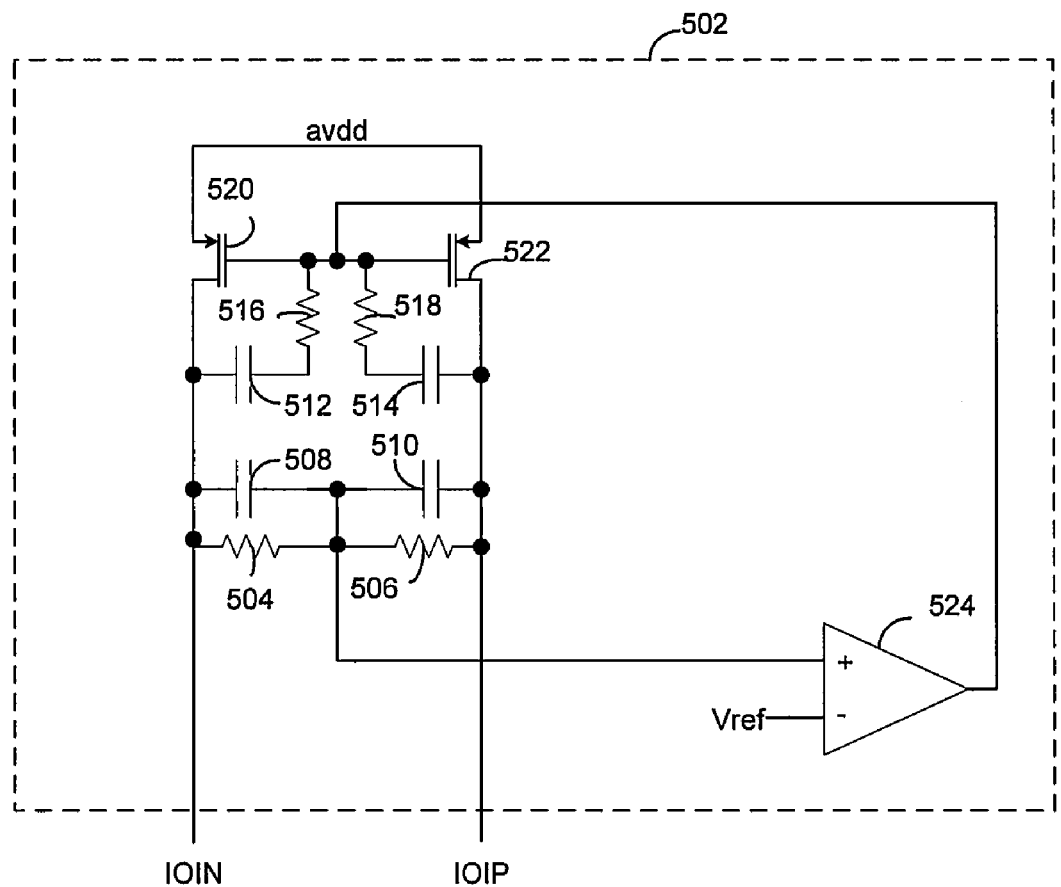
FIG. 5 is a diagram illustrating an exemplary common-mode feedback block, in accordance with an embodiment of the invention.

FIG. 5 is a diagram illustrating an exemplary common-mode feedback block, in accordance with an embodiment of the invention. Referring to FIG. 5, there is shown a common-mode feedback block 502. The common-mode feedback block 502 may comprise resistors 504, 506, 516 and 518, capacitors 508, 510, 512 and 514, MOSFETs 520 and 522 and amplifier 524. There is also shown in FIG. 5 a voltage reference signal Vref, a supply voltage avdd and currents IOIN and IOIP.

The positive terminal of amplifier 524 may be coupled to one terminal of capacitors 508 and 510, and resistors 504 and 506. The other terminal of capacitor 510 and resistor 506 may be coupled to IOIP. The other terminal of capacitor 512 and resistor 504 may be coupled to IOIN. One terminal of capacitor 514 may be coupled to IOIP and the other terminal may be coupled to one terminal of resistor 518. The other terminal of resistor 518 may be coupled to the gate of MOSFET 522. One terminal of capacitor 514 may be coupled to IOIN and the other terminal may be coupled to one terminal of resistor 516. The other terminal of resistor 516 may be coupled to the gate of MOSFET 520. The gates of MOSFETS 520 and 522 may be coupled to the output of amplifier 524. The sources of MOSFETs 520 and 522 may be coupled to the supply voltage avdd. The drain of MOSFET 522 may be coupled to IOIP. The drain of MOSFET 520 may be coupled to IOIN.

Illustrated in FIG. 5 may be an exemplary common-mode feedback block, corresponding to blocks 321, 327 and 330, illustrated in FIG. 3A and FIG. 3B. The illustrated circuits provide a load to the active mixer cores 322 and 328 and a positive feedback loop via the amplifier 524.

In accordance with an embodiment of the invention, a method and system for configurable Active/Passive Mixer 330 and 340, and Shared GM Stage 306 may comprise configuring an RF mixer 168 and 170 in frequency demodulator 166, as shown in FIG. 1B, to operate in an active mode or a passive mode. An in-phase (I) processing block 302 and a quadrature (Q) processing block 304 of the RF mixer 330 and 340 may utilize a single shared GM stage 306.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing signals in a communications system, the method comprising:
   processing an in-phase component signal for an in-phase channel and a quadrature component signal for a quadrature channel utilizing a shared transconductance stage in a frequency demodulator;
   generating a single differential output signal for said in-phase component signal and said quadrature component signal in said transconductance stage, wherein a load is communicatively coupled between a pair of output terminals of said transconductance stage corresponding to said single differential output signal; and
   adjusting a linearity of said transconductance stage utilizing one or more biasing signals.

2. The method according to claim 1, comprising isolating said in-phase channel from said quadrature channel.

3. The method according to claim 2, comprising isolating said in-phase channel from said quadrature channel using isolation resistors.

4. The method according to claim 3, comprising selecting a resistance value for said isolation resistors to balance signal attenuation and said isolating.

5. The method according to claim 2, comprising isolating an oscillator for said in-phase channel from a mixer for said quadrature channel.

6. The method according to claim 2, comprising isolating an oscillator for said quadrature channel from a mixer for said in-phase channel.

7. The method according to claim 1, comprising converting said load of said frequency demodulator from a passive load to an active load.

8. The method according to claim 7, comprising generating a common-mode feedback signal when said active load is configured to operate in an active mode.

9. The method according to claim 8, wherein said common mode feedback signal is generated via a common mode feedback circuit communicatively coupled to said active load to operate in said active mode.

10. The method according to claim 1, comprising generating a bias current when an RF mixer within said frequency demodulator is configured to operate in an active mode.

11. The method according to claim 10, comprising generating a common-mode feedback signal when said RF mixer is configured to operate in said active mode.

12. The method according to claim 11, wherein said common mode feedback signal is generated via a common mode feedback circuit communicatively coupled to said RF mixer.

13. The method according to claim 1, comprising processing wideband modulated signals when said frequency demodulator is configured to operate with an active transconductance-stage load.

14. The method according to claim 1, comprising processing narrowband modulated signals when said frequency demodulator is configured to operate with a passive transconductance-stage load.

15. A system for processing signals in a communications system, the system comprising:
   a frequency demodulator comprising a shared transconductance stage that is operable to process an in-phase component signal for an in-phase channel and a quadrature component signal for a quadrature channel;
   said frequency demodulator is operable to generate a single differential output signal for said in-phase component signal and said quadrature component signal in said transconductance stage, wherein a load is communicatively coupled between a pair of output terminals of said transconductance stage corresponding to said single differential output signal; and
   said frequency demodulator is operable to adjust a linearity of said transconductance stage utilizing one or more biasing signals.

16. The system according to claim 15, comprising one or more circuits that isolate said in-phase channel from said quadrature channel.

17. The system according to claim 16, comprising isolation resistors that isolate said in-phase channel from said quadrature channel.

18. The system according to claim 17, wherein resistance values for said isolation resistors results in balancing signal attenuation and said isolating.

19. The system according to claim 16, wherein said one or more circuits isolates an oscillator for said in-phase channel from a mixer for said quadrature channel.

20. The system according to claim 16, wherein said one or more circuits isolates an oscillator for said quadrature channel from a mixer for said in-phase channel.

21. The system according to claim 15, comprising one or more circuits that converts said load of said frequency demodulator from a passive load to an active load.

22. The system according to claim 21, wherein said one or more circuits generates a common-mode feedback signal when said active load is configured to operate in an active mode.

23. The system according to claim 22, comprising a common mode feedback circuit communicatively coupled to said active load that operates in said active mode and generates said common mode feedback signal.

24. The system according to claim 15, comprising one or more circuits that generates a bias current when an RF mixer within said frequency demodulator is configured to operate in an active mode.

25. The system according to claim 24, wherein said one or more circuits generates a common-mode feedback signal when said RF mixer is configured to operate in said active mode.

26. The system according to claim 25, comprising a common mode feedback circuit communicatively coupled to said RF mixer that generates said common mode feedback signal.

27. The system according to claim 15, comprising one or more circuits that processes wideband modulated signals when said frequency demodulator is configured to operate with an active transconductance-stage load.

28. The system according to claim 15, comprising one or more circuits that processes narrowband modulated signals when said frequency demodulator is configured to operate with a passive transconductance-stage load.

* * * * *